US012570351B2

(12) United States Patent
Rengarajan et al.

(10) Patent No.: US 12,570,351 B2
(45) Date of Patent: Mar. 10, 2026

(54) PINCH DETECTION FOR COLUMN ADJUSTMENT ACTUATORS

(71) Applicant: Steering Solutions IP Holding Corporation, Saginaw, MI (US)

(72) Inventors: Karthik Rengarajan, Rochester Hills, MI (US); Zaki Ryne, Rochester Hills, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 45 days.

(21) Appl. No.: 18/785,978

(22) Filed: Jul. 26, 2024

(65) Prior Publication Data

US 2026/0028059 A1 Jan. 29, 2026

(51) Int. Cl.
B62D 1/181 (2006.01)
B62D 1/187 (2006.01)

(52) U.S. Cl.
CPC ............. B62D 1/181 (2013.01); B62D 1/187 (2013.01)

(58) Field of Classification Search
CPC ................................ B62D 1/181; B62D 1/187
USPC ........................................ 701/41, 42, 43, 44
See application file for complete search history.

(56) References Cited

U.S. PATENT DOCUMENTS

| | | | |
|---|---|---|---|
| 3,962,931 A | 6/1976 | Moneta | |
| 6,840,113 B2 | 1/2005 | Fukumura | |
| 7,926,826 B2 | 4/2011 | Hayakawa | |
| 10,569,799 B2 | 2/2020 | Kim | |
| 10,654,511 B1 | 5/2020 | Cao | |
| 10,981,594 B2 | 4/2021 | Abuaita | |
| 11,667,322 B2 | 6/2023 | Wilson-Jones | |
| 12,384,442 B2 * | 8/2025 | Patel | B62D 1/183 |
| 2015/0048608 A1 | 2/2015 | Morinaga | |
| 2015/0090068 A1 | 4/2015 | Anspaugh | |
| 2023/0107621 A1 | 4/2023 | Patel | |
| 2023/0399043 A1 | 12/2023 | Fehlings | |

FOREIGN PATENT DOCUMENTS

| | | |
|---|---|---|
| CN | 115243955 A | 10/2022 |
| DE | 102020132014 A1 | 6/2022 |
| JP | 4973159 B2 | 7/2012 |
| JP | 6962006 B2 | 11/2021 |

* cited by examiner

*Primary Examiner* — Hai H Huynh
(74) *Attorney, Agent, or Firm* — Dickinson Wright PLLC

(57) ABSTRACT

A method for adjusting a position of a steering column includes adjusting a position of the steering column, determining a predicted velocity of the steering column, determining whether the predicted velocity is greater than an actual velocity of the steering column, and generating a signal indicating whether pinching is detected based on the determination of whether the predicted velocity is greater than the actual velocity. Generating the signal includes determining whether the predicted velocity is greater than the actual velocity, in response to a determination that the predicted velocity is greater than the actual velocity, determining an accumulated difference between the predicted velocity and the actual velocity over at least one of a predetermined time period and a predetermined number of samples, and generating the signal based on a determination of whether the accumulated difference exceeds a threshold.

20 Claims, 5 Drawing Sheets

PINCH DETECTION FOR COLUMN ADJUSTMENT ACTUATORS

TECHNICAL FIELD

This disclosure relates to systems and methods for adjusting steering wheel and steering column positions.

BACKGROUND OF THE INVENTION

A vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, a steer-by-wire (SbW) steering system, a hydraulic steering system, or other suitable steering system. The steering system of such a vehicle typically controls various aspects of vehicle steering including providing steering assist to an operator of the vehicle, controlling steerable wheels of the vehicle, and the like.

The steering system typically includes a steering or steering column assembly, such as an assembly including a steering wheel (which may be referred to as a handwheel) and a steering column. Steering column assemblies include features that enable the steering column assembly to be raised or lowered (e.g., rake adjustment) as wells as translated in and out (e.g., stow or telescope adjustment) relative to an operator of the vehicle.

SUMMARY OF THE INVENTION

This disclosure relates generally pinch detections techniques for steering column adjustment mechanisms.

An aspect of the disclosed embodiments includes a method for adjusting a position of a steering column that includes adjusting a position of the steering column, determining a predicted velocity of the steering column, determining whether the predicted velocity is greater than an actual velocity of the steering column, and generating a signal indicating whether pinching is detected based on the determination of whether the predicted velocity is greater than the actual velocity. Generating the signal includes determining whether the predicted velocity is greater than the actual velocity, in response to a determination that the predicted velocity is greater than the actual velocity, determining an accumulated difference between the predicted velocity and the actual velocity over at least one of a predetermined time period and a predetermined number of samples, and generating the signal based on a determination of whether the accumulated difference exceeds a threshold.

In other aspects, a system for adjusting a position of a steering column is configured to perform the methods described herein. In other aspects, a processing device is configured to execute instructions stored in memory to adjust a position of a steering column as described herein.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
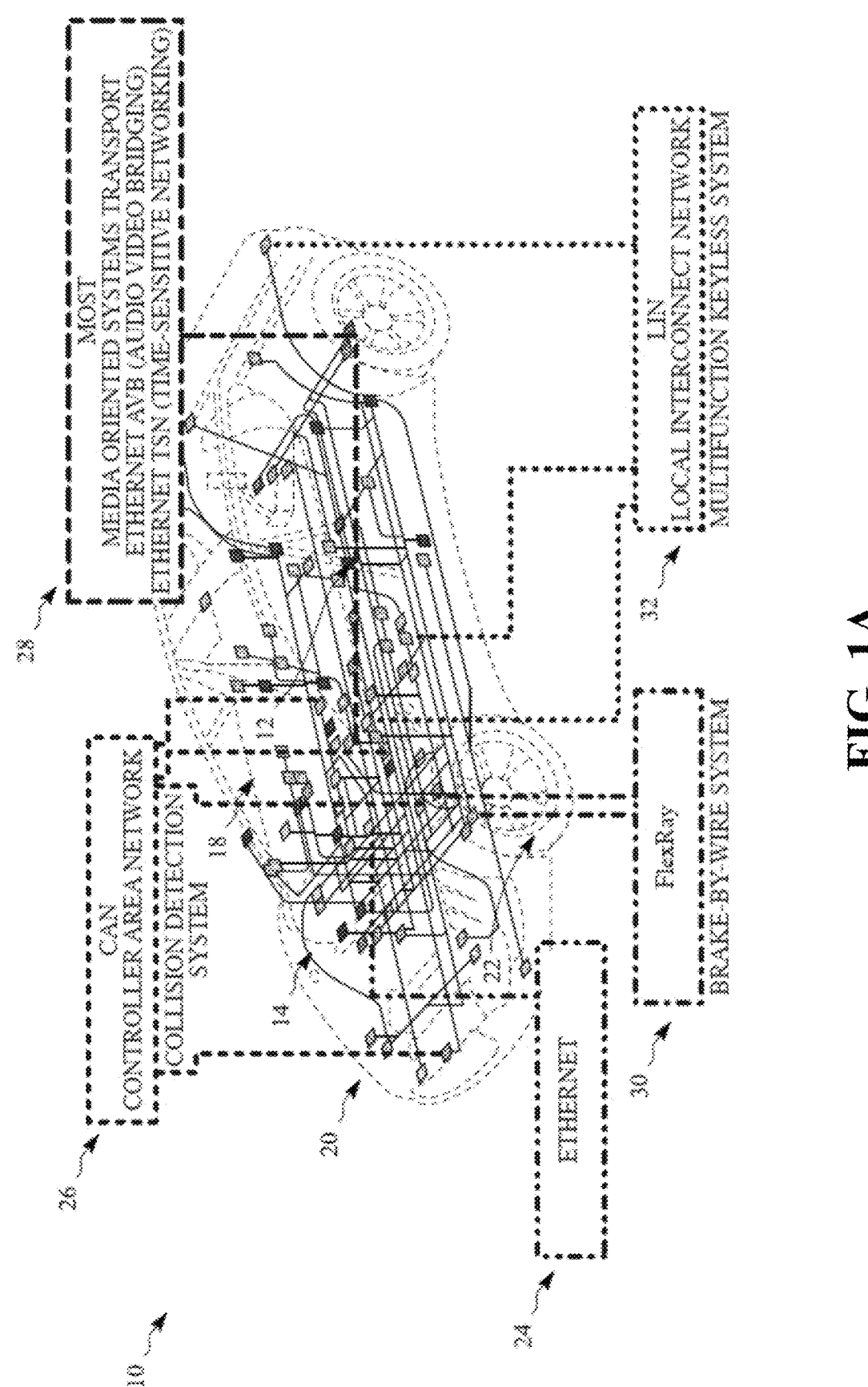
FIG. 1A generally illustrates a vehicle according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, a steer-by-wire (SbW) steering system, a hydraulic steering system, or other suitable steering system. The steering system of such a vehicle typically controls various aspects of vehicle steering including providing steering assist to an operator of the vehicle, controlling steerable wheels of the vehicle, and the like.

The steering system typically includes a steering or steering column assembly, such as an assembly including a steering wheel (referred to herein interchangeably with "handwheel") and a steering column. Steering column assemblies include features that enable the steering column assembly to be raised or lowered (e.g., which may be referred to as rake adjustment, adjustment of a rake position, etc.) as wells as translated in and out (e.g., which may be referred to as stow adjustment, adjustment of stow position, telescoping, etc.) relative to an operator of the vehicle. In some examples, adjustment of rake and stow positions (e.g., "column adjustment") may be performed using electrical and/or electromechanical techniques. In one example, respective actuators (i.e., two actuators) and corresponding motors (e.g., DC motors) and gear assemblies are provided for independent control of rake and stow adjustment.

For example, during cooperative and/or autonomous driving, rake and stow positions of the steering column assembly may be adjusted for comfort, convenience, or performance preferences, to provide additional space for the driver, etc. Similarly, when the vehicle is parked, the steering column assembly may be adjusted to provide additional space for the driver. In some examples, adjustment of the stow rake and stow positions may be automatic or semi-automatic (e.g., automatically performed by vehicle systems, performed in response to one or more conditions, driving or operating modes, or driver inputs being detected, etc.).

Column adjustment systems and methods according to the principles of the present disclosure are configured to implement one or more functions or features for preventing driver discomfort, interference, etc., such as pinch detection and pinch prevention features. For example, systems and methods as described herein are configured to, during electronic adjustment of the steering column, monitor and measure various signals ("detection signals"), operating characteristics, etc. of the steering column to perform pinch detection. Pinch detection may correspond to detecting obstruction of, or interference with, motion/movement of the steering column. Obstruction of movement of the steering column may be indicative of the presence of pinch (i.e., pinch corresponding to an external load, such as an object, body part of the driver, etc.). Accordingly, in response to detecting pinch, these systems and methods are configured to initiate anti-pinch functions (e.g., "pinch mitigation"), such as stopping movement of the steering column, retracting/reversing movement of the steering column, and so on.

In an example, the column adjustment systems and methods of the present disclosure are configured to determine effects of impulse disturbance on various detection signals. For example, a detection model may be configured to filter impulse disturbances from the detections signals and perform pinch detection based on the filtered detection signals as describe below in more detail.

FIG. 1A generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel or handwheel, and other such components are disposed in the passenger compartment 18 of the vehicle 10. The propulsion controls may be actuated or controlled by an operator of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), a hydraulic steering system (e.g., which may include a magnetic actuator incorporated into a valve assembly of the hydraulic steering system), or other suitable steering system.

The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof.

Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10. The steering system may be configured to implement column adjustment systems and methods according to the principles of the present disclosure.

Figure 1B:
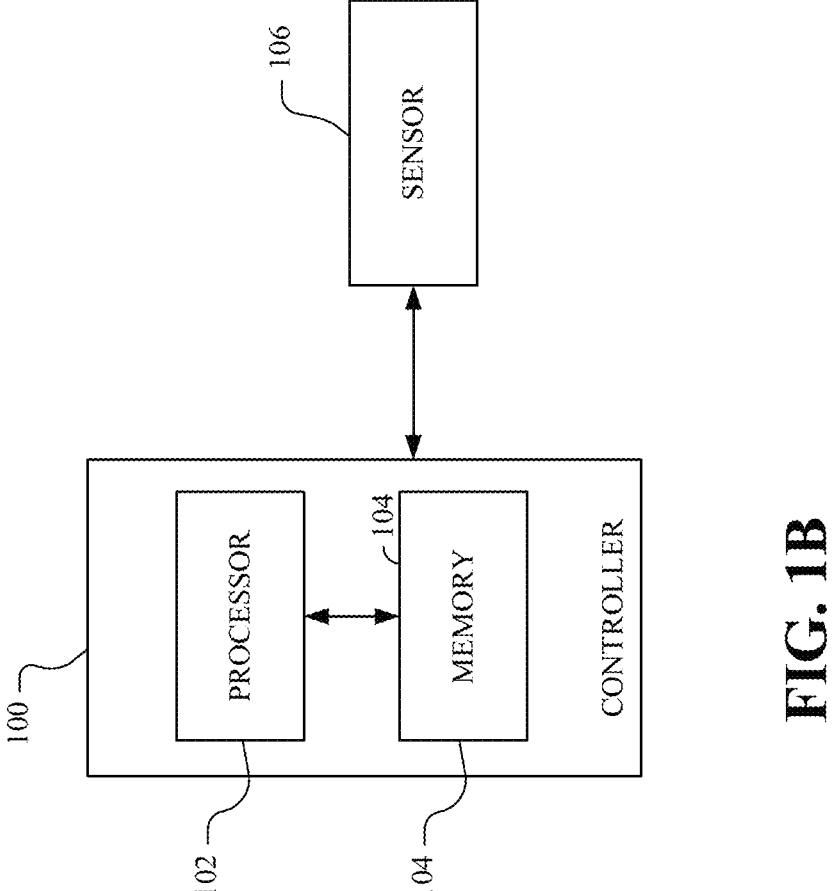
FIG. 1B generally illustrates a controller according to the principles of the present disclosure.

In some embodiments, the vehicle 10 may include a controller, such as controller 100, as is generally illustrated in FIG. 1B. The controller 100 may include any suitable controller, such as an electronic control unit or other suitable controller. The controller 100 may be configured to control, for example, the various functions of the steering system and/or various functions of the vehicle 10. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various aspects of the vehicle 10. Additionally, or alternatively, the memory 104 may include instructions that, when executed by the processor 102, cause the processor 102 to perform functions associated with the systems and methods described herein.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more position sensors or devices, other suitable sensors or devices, or a combination thereof. The one or more signals may indicate a handwheel torque, a handwheel angle, a motor velocity, a vehicle speed, other suitable information, or a combination thereof.

In some embodiments, the controller 100 may be configured to implement the column adjustment systems and methods of the present disclosure. However, the systems and methods described herein as implemented by the controller 100 are not meant to be limiting, and any type of software executed on a controller or processor can perform the methods described herein without departing from the scope of this disclosure. For example, a controller, such as a processor executing software within a computing device, can perform the methods described herein.

In an example, a controller (e.g., a controller associated with a vehicle, a steering system, etc.) is configured to perform column adjustment functions to adjust rake and/or stow positions of the steering wheel and perform pinch detection and mitigation as described below in more detail. As used herein, "rake" (which may correspond to a "rake angle") refers to an angular/rotational position of the steering wheel and/or steering column. For example, adjusting rake corresponds to adjusting an angle of the steering wheel relative to the chassis vertically upward or downward.

Conversely, "stow" refers to a telescope position of the steering wheel, such as a position along a longitudinal axis of a steering column (e.g., movement toward and/or away from the driver). In some contexts, various forms of the terms "stow" and "telescope" may be used interchangeably.

Figure 2:
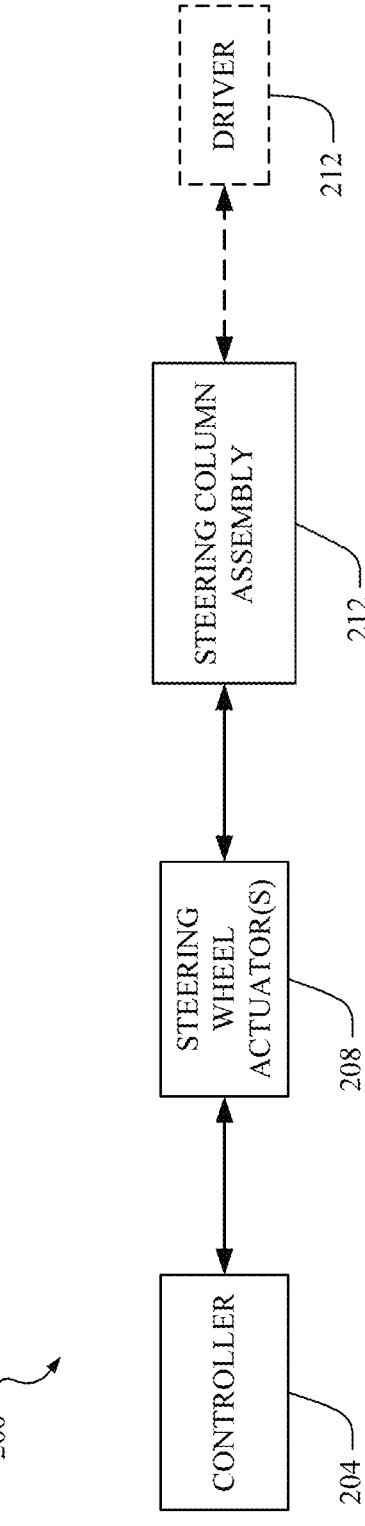
FIG. 2 generally illustrates an example pinch detection system according to the principles of the present disclosure.

FIG. 2 shows an example system (e.g., a column adjustment system) 200 of a according to the present disclosure. The system 200 includes a controller 204 configured to implement functions of a column adjustment system, including, but not limited to, controlling one or more steering wheel actuators 208 to adjust rake and/or stow positions of a steering column assembly 212 (e.g., a steering column and steering wheel/handwheel). The steering wheel actuators 208 include one or more actuators or actuator assemblies, motors, etc. configured to adjust the steering column assembly 212 as described herein, including, but not limited to, adjusting the rake and stow positions. For example, the actuators 208 includes two motor and gear assemblies configured to independently control rake and stow movement of the steering column assembly 212. A driver 216 of a vehicle including the system 200 is shown schematically.

The controller 204 receives inputs such as sensed, measured, estimated, or calculated values from the steering wheel actuators 208, the steering column assembly 212, the driver 216, and/or other vehicle systems or components and controls the actuators 208 accordingly. Further, the controller 204 is configured to perform pinch detection and mitigation as described below in more detail.

Figures 3A, 3B:
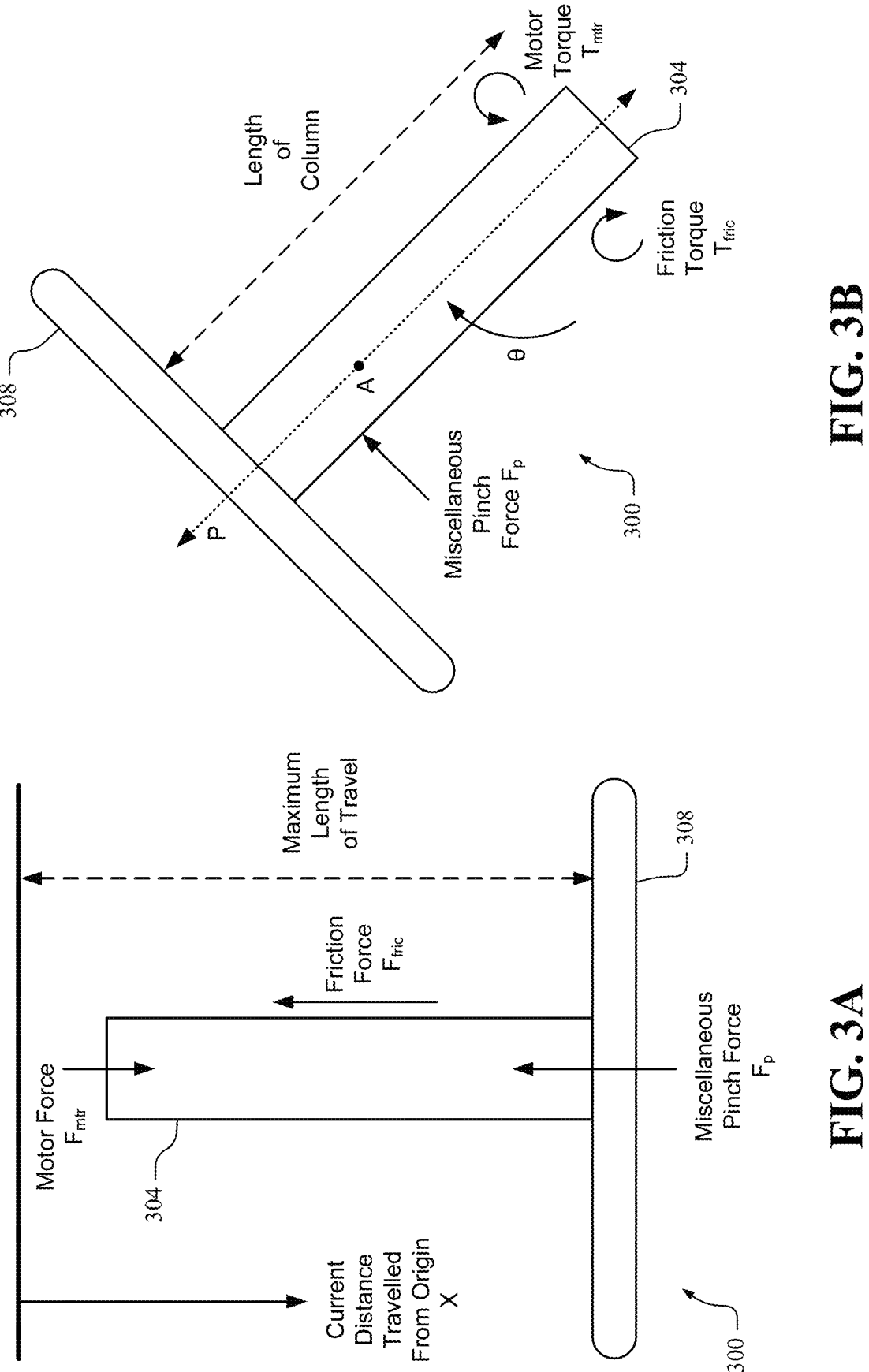
FIGS. 3A and 3B illustrate example force/motion models for stow and rake movement of a steering column assembly according to the principles of the present disclosure.

FIGS. 3A and 3B are example force/motion models (e.g., free-body diagrams) for stow and rake movement, respectively, of a steering column assembly 300 including a steering column 304 and steering wheel 308. FIGS. 3A and 3B illustrate various forces (which may be measured, estimated, calculated, modelled, etc.) associated with movement of the steering column assembly 300 and pinch detection. For example only, FIG. 3A models stow movement as a single mass damper system with a rigid coupling between a motor (e.g., a DC motor corresponding to a respective actuator of the steering wheel actuators 208) and the steering column 304. Similarly, FIG. 3B models rake movement as a single mass damper system with a rigid coupling between a motor (e.g., a DC motor corresponding to a respective actuator of the steering wheel actuators 208) and the steering column 304.

With respect to FIG. 3A, although shown although shown with respect to downward movement (i.e., toward a driver) of the steering column 304, the principles described herein are applicable for both upward and downward movement. In this example, spring effect and gravitational load are not considered. Accordingly, in this example, the model for stow movement can be described according to:

$mx''=F_{fric}-F_p$, which can be expressed as $mx''=F_{mtr}-bx'-F_p$ (Equation 1), where m is mass of the system, b is a damping or friction coefficient (which can be expressed as: $-b=f_b(T)$), x'' is column acceleration (which can be measured/sensed), $F_{mtr}$ is force exerted by the motor (which can be estimated based on motor torque commands), $F_{fric}$ is friction force, and $F_p$ is pinch force.

Equation 1 can be represented in discrete form as:

$$x'[k+1]=x'[k]+(K_c*I_{mtr}-bx'[k])*T_s/m, \text{ and}$$

$$x'[k+1] = x'[k] + (K_C * I_{mtr} - bx'[k]) * \frac{T_s}{m},$$

where $T_s$ is sampling time, $I_{mtr}$ is current through a rotor of the DC motor, $K_c$ is a ratio of motor current to a force of the column (which can be expressed as $-K_c=f_K(T)$), and k is a current time step.

Accordingly, a predicted column velocity $x'_{pred}[k]$ at a current time step k can be calculated based on:

$$x'_{pred}[k] = x'_{pred}[k-1] + \left(K_C * I_{mtr} - bx'_{pred}[k]\right) * \frac{T_s}{m};$$

and a difference between the predicted column velocity and an actual column velocity $x'_{act}[k]$ can be calculated based on $\Delta v[k]=x'_{pred}[k]-x'_{act}[k]$, where $\Delta v[k]$ is the difference between the predicted and actual column velocities at a time k and $x'_{act}[k]$ is the actual column velocity (which can be measured using one or more sensors, estimated, etc.).

The controller 204 can then detect pinch based on the difference between the predicted and actual column (linear) velocities. In one example, the controller 204 continuously (e.g., at a high sampling rate, such as once per ms or less) calculates the predicted column velocity and the difference, determines an accumulated or cumulative difference over time (e.g., a sum of differences between the predicted and actual column velocities over a plurality of samples), and detects pinch based on the accumulated difference. By detecting pinch based on the accumulated difference rather than any one instantaneous difference, impulse disturbances can be filtered out of the pinch detection. For example, temporary or momentary interference with movement of the steering column 304 (e.g., such as caused by momentary bumps or other contact) may cause the difference between the predicted and actual column velocities to increase without indicating an actual pinch condition.

The controller 204 calculates the predicted column velocity based on one or more operating characteristics, such as motor operating characteristics (e.g., motor current, temperature, etc.). In one example, the controller 204 implements a column velocity model configured to calculate the predicted column velocity. The controller 204 is further configured to determine an actual column velocity (e.g., based on column velocity and/or position sensor measurements, temperature, etc.). The controller 204 may determine whether the predicted column velocity is greater than the actual column velocity (or greater than some predetermined threshold amount above the actual column velocity, such as at least 1% greater than the actual column velocity, 5% greater than the actual column velocity, etc.). Since obstruction by an external load (i.e., pinching) reduces the actual column velocity, the predicted column velocity being greater than the actual column velocity may be an indicator of a pinch condition. Accordingly, the controller 204 determines whether $x'_{pred}[k]>x'_{act}[k]$. If true, the controller 204 calculates a sum of the differences between the predicted and actual column velocities over a plurality of samples (e.g., 10 samples, 100 samples, etc.) and/or over a predetermined period of time (e.g., 10 ms, 100 ms, etc.) as $\Sigma\Delta v[k]\forall k$. If not true (e.g., in response to the predicted column velocity not being greater than the actual column velocity for any sample in the plurality of samples or over the predetermined period of time), the controller 204 resets the sum to zero in accordance with $\Sigma\Delta v[k]=0$.

The controller 204 compares the sum of the differences to a detection threshold D and detects a pinch condition based on the comparison in accordance with:

$$\Sigma\Delta v[k]\geq D(x'_{act},x_{act}),$$

where a pinch is determined to be present (i.e., pinch detected=TRUE) in response to the sum of the differences being greater than or equal to the threshold an a pinch is considered to be not present (i.e., pinch detected=FALSE) in response to the sum of the differences being less than the threshold. In this example, $D(x'_{act},x_{act})$ is a threshold that may be selected/adjusted based on actual column position and velocity. In some examples, the threshold may be retrieved from a lookup table.

Conversely, with respect to FIG. 3B, the model for rake movement can be described according to: $J\theta''=T_{mtr}-T_{Fric}-F_p*L$, which can be expressed as $J\theta''=T_{mtr}-b\theta'-F_p*L$ (Equation 2), where J is moment of inertia of the system with respect to an axis (as shown at A in FIG. 3B, which is parallel to a plane P), b is a damping or friction coefficient (which can be expressed as: $-b=f_b(T)$), $\theta'$ is column angular (or rotational) velocity, $\theta''$ is column angular acceleration, and L is a length of the steering column 304.

Equation 2 can be represented in discrete form as:

$$\theta'[k+1] = \theta'[k] + (T_{mtr} - T_{Fric}[k]) * \frac{T_s}{J};$$

$$\theta'[k+1] = \theta'[k] + (T_{mtr} - b\theta'[k]) * \frac{T_s}{J};$$

and $$\theta'[k+1]=\theta'[k]+(K_C*I_{mtr}-b\theta'[k])*T_s/J,$$

where $T_s$ is sampling time, $I_{mtr}$ is current through a rotor of the DC motor, $K_c$ is a ratio of motor current to a force/torque of the column (which can be expressed as $-K_c=f_K(T)$), and k is a current time step.

Accordingly, a predicted angular velocity $\theta'_{pred}[k]$ at a current time step k can be calculated based on:

$$\theta'_{pred}[k] = \theta'_{pred}[k-1] + \left(K_C * I_{mtr} - b\theta'_{pred}[k]\right) * \frac{T_s}{m};$$

And a difference between the predicted angular velocity and the actual angular velocity $\theta'_{act}[k]$ can be calculated based on $\Delta w[k]=\theta'_{pred}[k]-\theta'_{act}[k]$, where $\Delta w[k]$ is the difference between the predicted and actual angular velocities of the steering column 304 at a time/sample k and $\theta'_{act}[k]$ is the actual angular velocity (which can be measured using one or more sensors, estimated, etc.).

The controller 204 can then detect pinch based on the difference between the predicted and actual angular velocities. In one example, the controller 204 continuously (e.g., at a high sampling rate, such as once per ms or less) calculates the predicted angular velocity and the difference, determines an accumulated difference over time (e.g., a sum of differences between the predicted and actual angular velocities over a plurality of samples), and detects pinch based on the accumulated difference. By detecting pinch based on the accumulated difference rather than any one instantaneous difference, impulse disturbances can be filtered out of the pinch detection as described above.

The controller 204 calculates the predicted angular velocity based on one or more operating characteristics, such as motor operating characteristics (e.g., motor current, temperature, etc.). In one example, the controller 204 implements an angular velocity model configured to calculate the predicted angular velocity. The controller 204 is further configured to determine an actual angular velocity (e.g., based on angular velocity and/or position sensor measurements, temperature, etc.). The controller 204 may determine whether the predicted angular velocity is greater than the actual angular velocity (or greater than some threshold amount above the actual angular velocity). Since obstruction by an external load (i.e., pinching) reduces the actual angular velocity, the predicted angular velocity being greater than the actual angular velocity may be an indicator of a pinch condition. Accordingly, the controller 204 determines whether $\theta'_{pred}[k] > \theta'_{act}[k]$. If true, the controller 204 calculates a sum of the differences between the predicted and actual angular velocities over a plurality of samples (e.g., 10 samples, 100 samples, etc.) and/or over a predetermined period of time (e.g., 10 ms, 100 ms, etc.) as $\Sigma \Delta w[k] \forall k$. If not true (e.g., in response to the predicted angular velocity not being greater than the actual angular velocity for any sample in the plurality of samples or over the predetermined period of time), the controller 204 resets the sum to zero in accordance with $\Sigma \Delta w[k] = 0$.

The controller 204 compares the sum of the differences to a detection threshold D and detects a pinch condition based on the comparison in accordance with:

If $\Sigma \Delta w[k] \geq D(\theta'_{act}, \theta_{act})$, where a pinch is determined to be present (i.e., pinch detected=TRUE) in response to the sum of the differences being greater than or equal to the threshold an a pinch is considered to be not present (i.e., pinch detected=FALSE) in response to the sum of the differences being less than the threshold. In this example, $D(\theta'_{act}, \theta_{act})$ is a threshold that may be selected/adjusted based on actual angular position and velocity.

Figure 4:
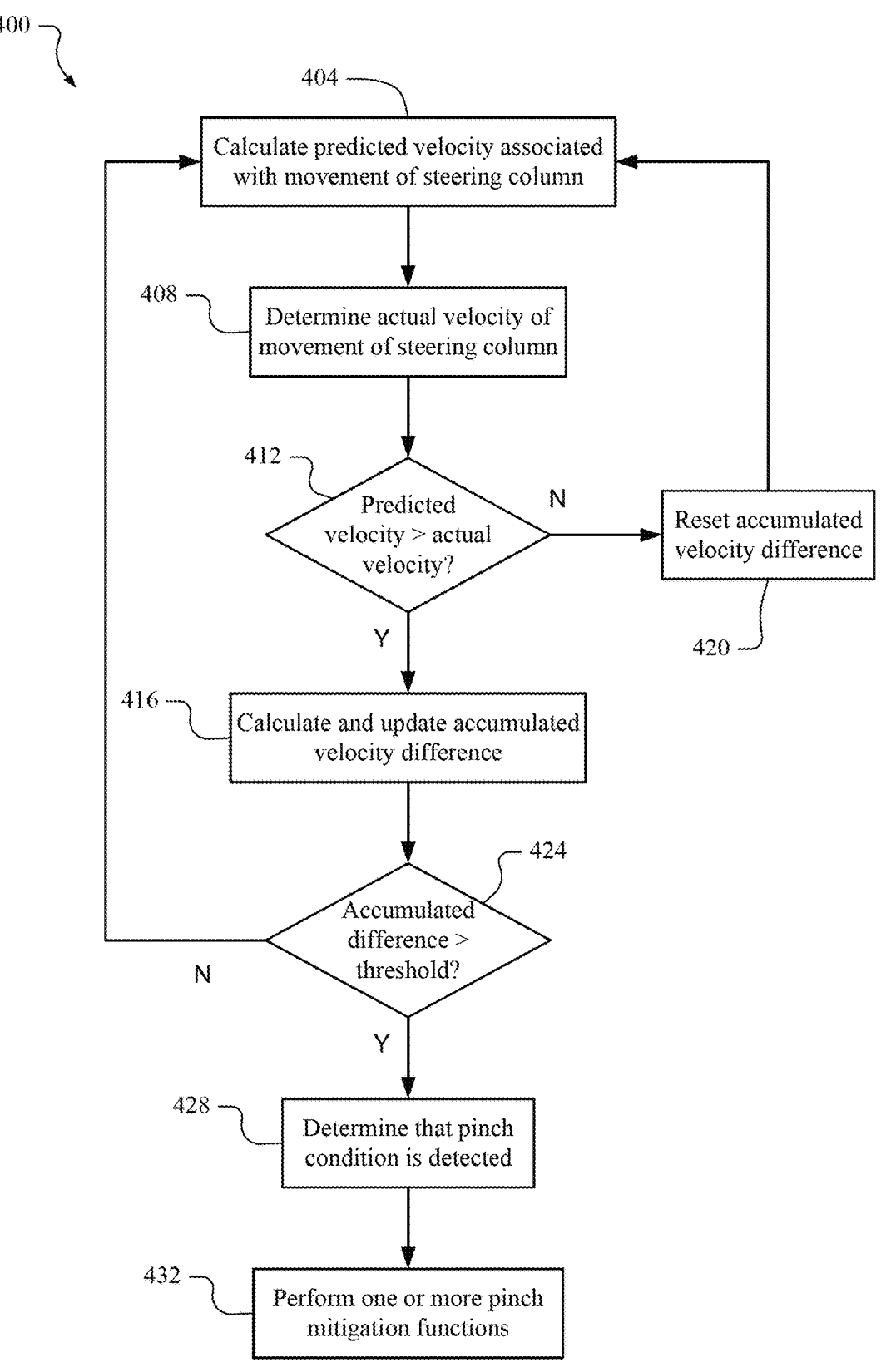
FIG. 4 is a flow diagram generally illustrating steps of an example pinch detection method according to the principles of the present disclosure.

FIG. 4 is a flow diagram generally illustrating an example pinch detection method 400 according to the principles of the present disclosure. For example, one or more computing devices, processors or processing devices, etc. are configured to execute instructions to implement the method 400, such as one or more of the processors of the systems described herein (e.g., a computing device or processor of a vehicle configured to implement the system 200, the controller 204, etc.). One or more of the steps of the method 400 as described below may be skipped or omitted in some examples, and/or one or more of the steps may be performed in a different sequence than described.

At 404, the method 300 includes calculating one or more predicted velocities associated with a steering column. The predicted velocities may include one or both of a predicted column (linear) velocity and a predicted angular velocity as described herein. In an example, the predicted velocities are calculate based on motor current (i.e., current of respective motors configured to control linear and angular movement of the steering column) and temperature (e.g., temperature of one or more components associated with the steering column, such as motor temperature).

At 408, the method 400 includes determining actual column velocities. For example, actual column velocities can be determine based on one or more of sensor measurements (e.g., velocity and position sensor measurements), estimates, etc.

At 412, the method 400 includes determining whether a predicted velocity (e.g., whether one or both of a predicted column velocity and angular velocity, for a single, most recent sample) is greater than the actual velocity. If true, the method 400 continues to 416. If false, the method 400 continues to 420. At 420, the method 400 includes resetting an accumulated velocity difference (e.g., to zero) and then continues to 404.

At 416, the method 400 includes calculating and updating the accumulated velocity difference. For example, the method 400 includes obtaining the velocity difference (i.e., the difference between most recent predicted and actual velocities) and updating the accumulated velocity difference accordingly (e.g., summing the velocity difference with previous velocity differences).

At 424, the method 400 includes determining whether the accumulated difference is greater than a threshold (e.g., a fixed threshold, a variable threshold based on a number of samples, period of time, steering column position and/or velocity, etc.). If true, the method 400 continues to 428. If false, the method 400 continues to 404.

At 428, the method 400 includes determining that a pinch condition is detected. For example, the method 400 may include setting a flag or other indicator (e.g., in memory) that a pinch condition is present.

At 432, the method 400 includes performing one or more pinch mitigation functions, such as stopping movement of the steering column and/or reversing/retracting movement of the steering column.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for adjusting a position of a steering column, the method comprising:
   adjusting a position of the steering column;
   determining a predicted velocity of the steering column;
   determining whether the predicted velocity is greater than an actual velocity of the steering column; and
   generating a signal indicating whether pinching is detected based on the determination of whether the predicted velocity is greater than the actual velocity, wherein generating the signal includes
   determining whether the predicted velocity is greater than the actual velocity,
   in response to a determination that the predicted velocity is greater than the actual velocity, determining an accumulated difference between the predicted velocity and the actual velocity over at least one of (i) a predetermined time period and (ii) a predetermined number of samples, and
   generating the signal based on a determination of whether the accumulated difference exceeds a threshold.

2. The method of claim 1, further comprising, in response to the signal indicating that pinching is detected, at least one of (i) stopping movement of the steering column and (ii) reversing movement of the steering column.

3. The method of claim 1, wherein adjusting the position of the steering column includes adjusting at least one of a linear position and an angular position of the steering column.

4. The method of claim 3, wherein the predicted velocity corresponds to at least one of a linear velocity and an angular velocity of the steering column.

5. The method of claim 4, wherein adjusting the position of the steering column includes generating a current signal to drive a motor to adjust the at least one of the linear position and the angular position of the steering column.

6. The method of claim 5, wherein determining the predicted velocity includes determining the predicted velocity based on at least one of the current signal and a temperature associated with the motor.

7. The method of claim 1, further comprising updating the accumulated difference each time that the predicted velocity is greater than the actual velocity within the at least one of (i) the predetermined time period and (ii) the predetermined number of samples.

8. The method of claim 7, further comprising setting the accumulated difference to zero in response to a determination that the predicted velocity is not greater than the actual velocity.

9. The method of claim 1, wherein determining whether the predicted velocity is greater than the actual velocity includes determining whether the predicted velocity is greater than the actual velocity by at least a predetermined amount.

10. A system for controlling a position of a steering column of a vehicle, the system comprising:
   a controller configured to
      adjust a position of the steering column,
      determine a predicted velocity of the steering column,
      determine whether the predicted velocity is greater than an actual velocity of the steering column, and
      generate a signal indicating whether pinching is detected based on the determination of whether the predicted velocity is greater than the actual velocity, wherein generating the signal includes
      determining whether the predicted velocity is greater than the actual velocity,
      in response to a determination that the predicted velocity is greater than the actual velocity, determining an accumulated difference between the predicted velocity and the actual velocity over at least one of (i) a predetermined time period and (ii) a predetermined number of samples, and
      generating the signal based on a determination of whether the accumulated difference exceeds a threshold; and
   at least one actuator configured to, responsive to the controller, adjust the position of the steering column.

11. The system of claim 10, wherein the controller is further configured to, in response to the signal indicating that pinching is detected, at least one of (i) stop movement of the steering column and (ii) reverse movement of the steering column.

12. The system of claim 10, wherein adjusting the position of the steering column includes adjusting at least one of a linear position and an angular position of the steering column.

13. The system of claim 12, wherein the predicted velocity corresponds to at least one of a linear velocity and an angular velocity of the steering column.

14. The system of claim 13, wherein adjusting the position of the steering column includes generating a current signal to drive a motor to adjust the at least one of the linear position and the angular position of the steering column.

15. The system of claim 14, wherein determining the predicted velocity includes determining the predicted velocity based on at least one of the current signal and a temperature associated with the motor.

16. The system of claim 10, wherein the controller is further configured to update the accumulated difference each time that the predicted velocity is greater than the actual velocity within the at least one of (i) the predetermined time period and (ii) the predetermined number of samples.

17. The system of claim 16, wherein the controller is further configured to set the accumulated difference to zero in response to a determination that the predicted velocity is not greater than the actual velocity.

18. The system of claim 10, wherein determining whether the predicted velocity is greater than the actual velocity includes determining whether the predicted velocity is greater than the actual velocity by at least a predetermined amount.

19. A processing device configured to execute instructions stored in memory to control a position of a steering column of a vehicle, the instructions comprising:

adjusting a position of the steering column;

determining a predicted velocity of the steering column;

determining whether the predicted velocity is greater than an actual velocity of the steering column; and generating a signal indicating whether pinching is detected based on the determination of whether the predicted velocity is greater than the actual velocity, wherein generating the signal includes determining whether the predicted velocity is greater than the actual velocity, in response to a determination that the predicted velocity is greater than the actual velocity, determining an accumulated difference between the predicted velocity and the actual velocity over at least one of (i) a predetermined time period and (ii) a predetermined number of samples, and generating the signal based on a determination of whether the accumulated difference exceeds a threshold.

20. The processing device of claim 19, wherein the instructions further comprise:

in response to the signal indicating that pinching is detected, at least one of (i) stopping movement of the steering column and (ii) reversing movement of the steering column, wherein adjusting the position of the steering column includes adjusting at least one of a linear position and an angular position of the steering column, the predicted velocity corresponds to at least one of a linear velocity and an angular velocity of the steering column, and adjusting the position of the steering column includes generating a current signal to drive a motor to adjust the at least one of the linear position and the angular position of the steering column.

* * * * *